T. A. WESTON.
Improved Shaft Coupling.
No. 120,686.  Patented Nov. 7, 1871.
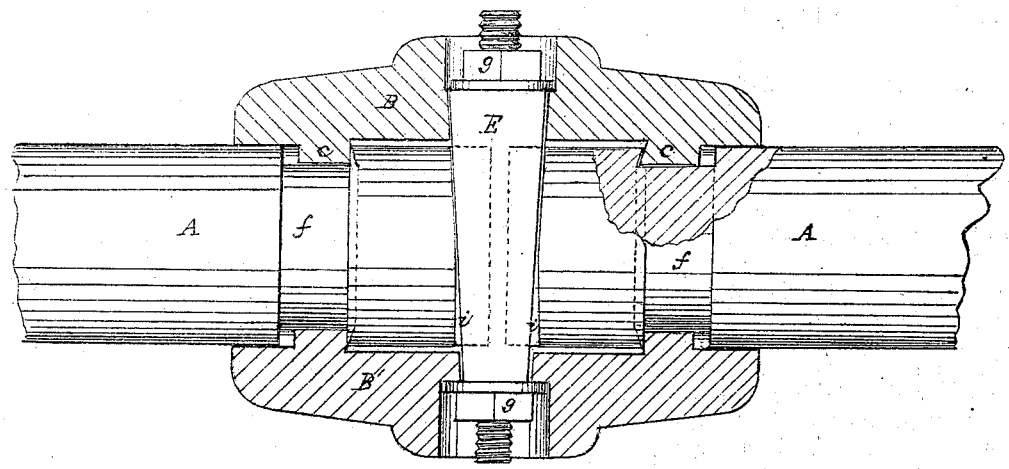
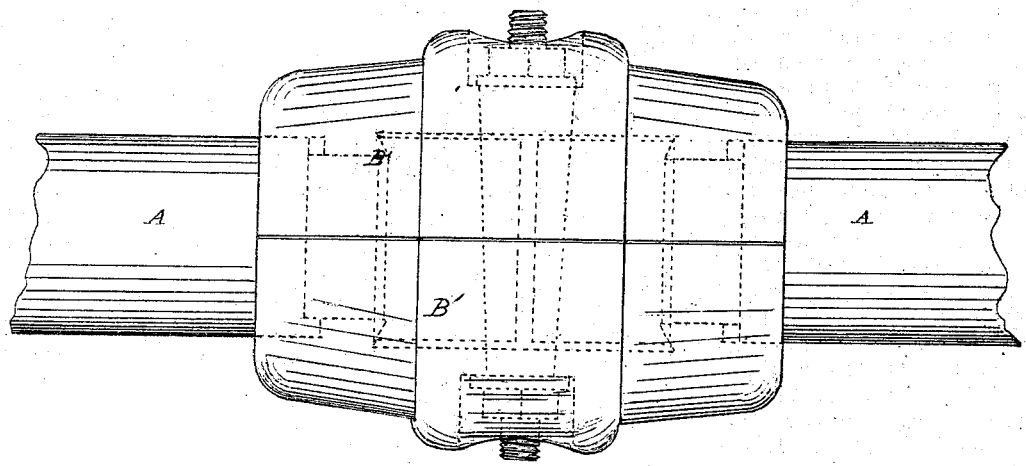
Witnesses:
Wheeler W. Phillips.
Kate N. Jones.
Inventor:
Thos. Aldridge Weston
Per J. Fraser & Co.
attys

UNITED STATES PATENT OFFICE.

THOMAS ALDRIDGE WESTON, OF RIDGEWOOD, NEW JERSEY, ASSIGNOR TO HIMSELF AND FRANKLIN B. COLTON, OF PHILADELPHIA, PENNSYLVANIA.

IMPROVEMENT IN SHAFT-COUPLINGS.

Specification forming part of Letters Patent No. 120,686, dated November 7, 1871; antedated November 2, 1871.

*To all whom it may concern:*

Be it known that I, THOMAS ALDRIDGE WESTON, of Ridgewood, in the county of Bergen, in the State of New Jersey, have invented an Improved Shaft-Coupling, of which the following is a specification:

My improved coupling consists of a box or sleeve, divided longitudinally into two equal parts or halves, provided on their interior faces with two collars, and a wedge-shaped bolt passed transversely through them, by means of which the ends of the shafts, when adapted thereto, and the several parts of the coupling, are all firmly locked together.

Figure 1 is a longitudinal section of my coupling, the ends of the shaft to which it is applied being shown in elevation. Fig. 2 is an external view or elevation of the same.

As represented in the drawing, A A are the ends of the shafts, and B B' the halves of the box or sleeve. On the inner surface of the latter are provided two collars or annular projections, $c\,c$, beveled in section upon their proximate ends, and there are corresponding grooves $f\,f$ formed around the shaft ends, the said grooves being rather wider than the collars to admit of a limited motion endwise. Across the end of each shaft is a transverse cut or key-way, $i\,i$, deep enough to receive the bolt E to about one-half its width. These key-ways may have their bed or bottom tapered or sloped throughout parallel with the sides of the wedge-shaped key, or the bed may be sloped both ways, as shown in the drawing. The wedge-bolt may be of square, annular, or of any other convenient sectional figure. Upon both ends of the bolt E are screw-threads which receive the nuts $g\,g$ in counter-sinks provided in the halves of the collar, the bolt being of such length that the two ends project but little, if any, beyond the surface.

The coupling is effected as follows: The two shafts A A being in line their ends are brought together, when the parts B B' are applied, their collars entering the grooves $f\,f$ and their bolt-holes in line with the key-ways $i\,i$ in the shaft ends. The bolt E is then passed through all the parts and the nut screwed on the smaller end, tightening it until its wedge form, by separating the two shafts, locks the correspondingly-beveled sides of the collars $c\,c$ and grooves $f\,f$ firmly together. The nut is then screwed on the larger end of the bolt, and the connection is complete. Instead of a nut the larger end may be provided with a head, or left simply of wedge-form, though a nut is preferable to insure perfect adjustment.

The advantages of this coupling are, that the shafts are held perfectly in line and the connection rigid; that endwise motion is wholly avoided; and that the few parts are held by a single bolt and nut or nuts, rendering it simple in application and perfectly secure.

I claim as my invention—

A shaft-coupling formed of the divided sleeve B B', provided with the collars $c\,c$ fitting into corresponding grooves on the shaft, with the wedge-shaped key-bolt E, the shaft ends A A being fitted thereto, substantially as set forth.

THOMAS ALDRIDGE WESTON.

Witnesses:
KATE N. JONES,
J. FRAZER.

(31)